(12) United States Patent
McElvain

(10) Patent No.: US 7,836,417 B1
(45) Date of Patent: Nov. 16, 2010

(54) METHOD AND APPARATUS FOR PARALLEL CARRY CHAINS

(75) Inventor: Ken S. McElvain, Los Altos, CA (US)

(73) Assignee: Synopsys, Inc., Mountain View, CA (US)

( * ) Notice: Subject to any disclaimer, the term of this patent is extended or adjusted under 35 U.S.C. 154(b) by 802 days.

(21) Appl. No.: 11/388,326

(22) Filed: Mar. 23, 2006

Related U.S. Application Data (62) Division of application No. 10/817,586, filed on Apr. 2, 2004, now Pat. No. 7,051,296, which is a division of application No. 09/699,138, filed on Oct. 27, 2000, now Pat. No. 6,807,556.

(51) Int. Cl.
*G06F 17/50* (2006.01)

(52) U.S. Cl. ............... 716/6; 716/1; 716/12; 716/17

(58) Field of Classification Search .......... 716/1, 716/6, 12, 17
See application file for complete search history.

(56) References Cited

U.S. PATENT DOCUMENTS

| | | | | |
|---|---|---|---|---|
| 4,853,887 A | * | 8/1989 | Jutand et al. | 708/703 |
| 4,885,716 A | * | 12/1989 | Little | 708/707 |
| 5,229,959 A | * | 7/1993 | Scriber | 708/706 |
| 5,272,662 A | * | 12/1993 | Scriber et al. | 708/714 |
| 5,285,406 A | * | 2/1994 | Lynch et al. | 708/714 |
| 5,483,478 A | * | 1/1996 | Chiang | 708/710 |
| 5,487,025 A | * | 1/1996 | Partovi et al. | 708/714 |
| 6,003,059 A | * | 12/1999 | Bechade | 708/714 |
| 6,154,053 A | * | 11/2000 | New | 326/41 |
| 6,359,468 B1 | * | 3/2002 | Park et al. | 326/39 |
| 6,405,269 B1 | * | 6/2002 | Camilleri et al. | 710/57 |
| 6,434,642 B1 | * | 8/2002 | Camilleri et al. | 710/57 |
| 6,807,556 B1 | | 10/2004 | McElvain | |
| 7,051,296 B1 | | 5/2006 | McElvain | |

* cited by examiner

*Primary Examiner*—Thuan Do
(74) *Attorney, Agent, or Firm*—Blakely, Sokoloff, Taylor & Zafman, LLP; Judith A. Szepesi (57) ABSTRACT

An apparatus having two or more parallel carry chain structures, each of the carry chain structures comprising a series of logical structures, where at least one of the logical structures within each of the carry chain structures has an associated input node, output node and carry node. The input node corresponds to a function input term, the output node corresponds to an output term of the function and the carry node corresponds to a carry value to a following logical structure in the series of logical structures.

24 Claims, 12 Drawing Sheets

| STATE OF COEFFICIENT PAIR $a_{N+1}$ $a_N$ | | CARRY IN | CARRY CHAIN OUTPUT 703 | CARRY CHAIN OUTPUT 702 | CARRY OUT |
|---|---|---|---|---|---|
| 0 | 0 | 0 | 0 | 0 | 0 |
| 0 | 0 | 1 | 0 | 1 | 0 |
| 0 | 1 | 0 | 0 | 1 | 0 |
| 0 | 1 | 1 | 1 | 0 | 0 |
| 1 | 0 | 0 | 1 | 0 | 0 |
| 1 | 0 | 1 | 1 | 1 | 1 |
| 1 | 1 | 0 | 1 | 1 | 1 |
| 1 | 1 | 1 | 0 | 0 | 1 |

METHOD AND APPARATUS FOR PARALLEL CARRY CHAINS

This application is a divisional application and claims the priority date of U.S. patent application Ser. No. 10/817,586, filed Apr. 2, 2004 now U.S. Pat. No. 7,051,296 which is a divisional of Ser. No. 09/699,138 filed Oct. 24, 2000 now U.S. Pat. No. 6,807,556, issued on Oct. 19, 2004.

FIELD OF INVENTION

The field of invention relates to semiconductor device technology generally and, more specifically, to carry chain structures associated with semiconductor device design.

BACKGROUND

A carry chain is a series of logical structures that together perform an overall function. Each logical structure typically has an output term and a carry out term that are functions of a carry input term from a prior logical structure in the series and an input term.

Figure 1A:
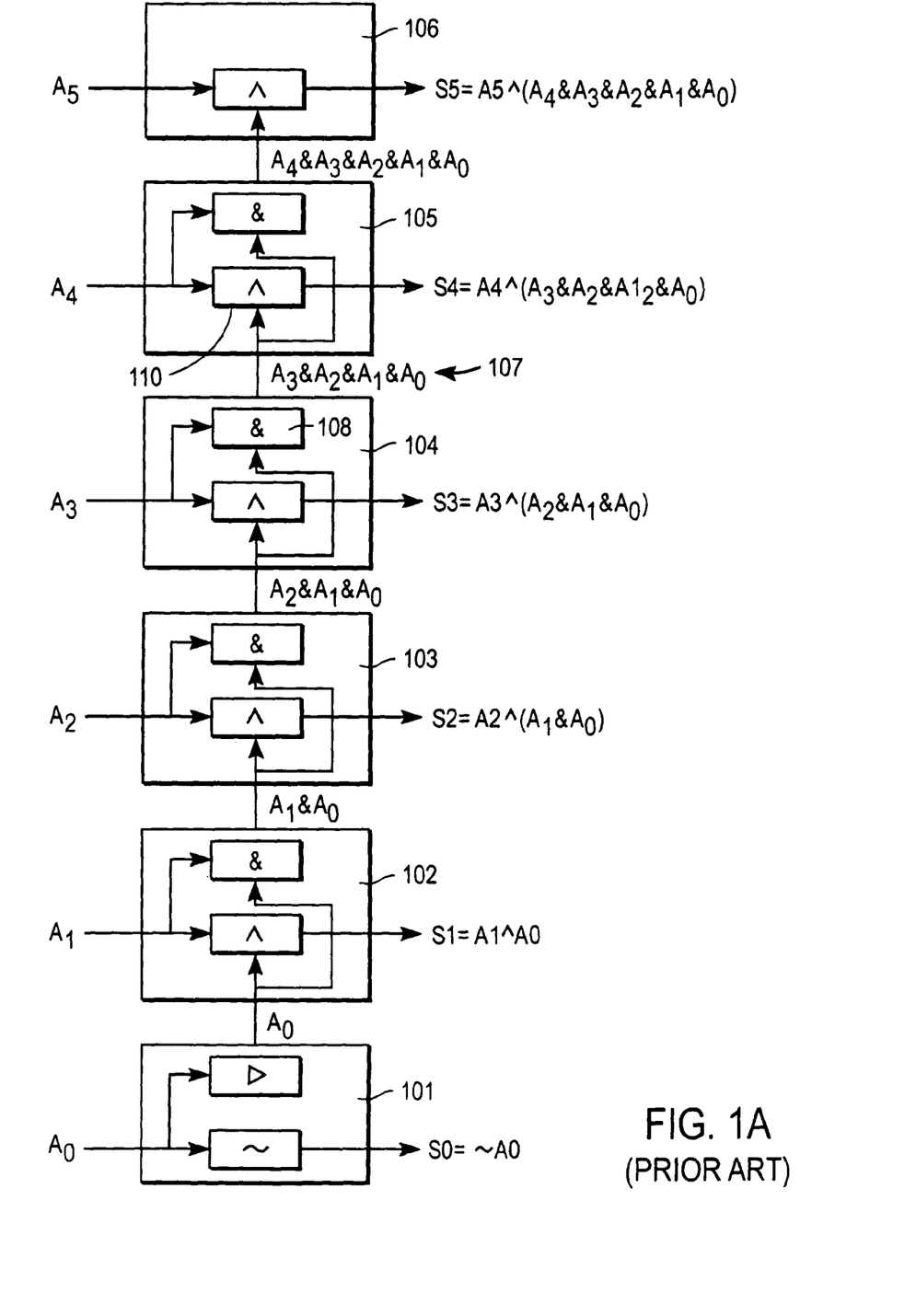
FIG. 1A shows a traditional carry chain implementation.

FIG. 1A shows a six bit incrementor function 100 implemented as a carry chain 100 having a sequence of six logical structures 101-106. Incrementers are functions that add a value (e.g., "1") to an input value (e.g., a 000000 input corresponds to an output of 000001). Input terms of the incrementer function are presented on input nodes A0 through A5. The input terms are used to determine the output terms (on output nodes S0 through S5) of the incrementer function.

Logical structures 101 through 106 contain one or more functional units (e.g., functional unit 110 within logical structure 105) that typically accept one or more input terms and a carry input term to produce another output term or carry term. A functional unit effectively performs a logical operation upon or with its input value(s).

Referring to logical structure 105 as an example, note that the S4 output term depends upon the carry value 107 produced by a functional unit 108 (executed by the prior logical structure 104) and the fourth input term A4. Similar dependencies repeat themselves through the carry chain.

Figure 1B:
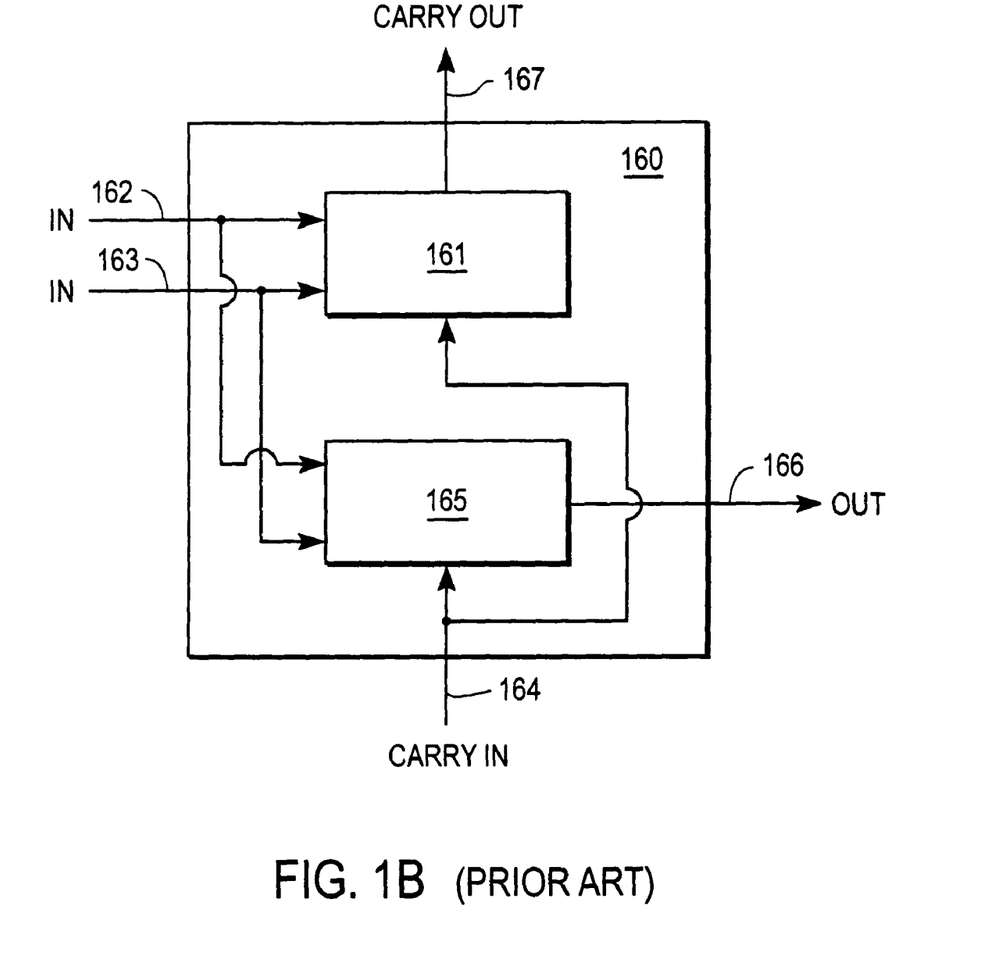
FIG. 1B shows an exemplary logical structure.

FIG. 1B shows a possible logical structure implementation 160. The logical structure 160 comprises a first look up table 161 (LUT) having three inputs 162 through 164. The look up table 161, which corresponds to a functional unit, may be used to effectively implement a logical operation upon or with the values presented at inputs 162 through 164. Note that an input (e.g., input 164) may be used as a carry input. The second lookup table 165 also receives inputs 162 through 164. The first look up table 161 may be used to generate an output term 166 while the second look up table 165 may be used to generate a carry output term 167.

Note that look up table 161 and 165 may be viewed as functional units within the logical structure 160. In alternate embodiments, the function provided by the look up tables may be enhanced (or otherwise added to) by other logic components within the logical structure (such as by a multiplexer that drives the carry output 167 or an XOR gate that drives the output 166). Actual logic may be used instead of look-up tables as well.

Significant amounts of time may be consumed by the carry chain 100 of FIG. 1A in order to execute the function. That is, referring to FIG. 1a, in order to fully execute the overall function represented by the carry chain 100 each logical structure 101-106 must be executed. Thus the total propagation delay of the carry chain 100 (and thus of the overall function) corresponds to the summed propagation delay over all logical structures 101-106. Because many vendors currently have a limit of one output term per logical structure, a logical structure has to be separately executed for each output term in the function performed by the carry chain. The time consumed as a result may be undesirable in various applications because each output term has to "wait" for all lower order terms to be determined beforehand.

SUMMARY OF THE INVENTION

An apparatus comprising two or more parallel carry chain structures, each of the carry chain structures comprising a series of logical structures, where at least one of the logical structures within each of the carry chain structures has an associated input node, output node and carry node. The input node corresponds to a function input term, the output node corresponds to an output term of the function and the carry node corresponds to a carry value to a following logical structure in the series of logical structures.

BRIEF DESCRIPTION OF THE DRAWINGS

The present invention is illustrated by way of example and not limitation in the figures of the accompanying drawings, in which like references indicate similar elements, and in which:

FIG. 2B shows two parallel carry chains used to implement the function traditionally implemented with the carry chain structure of FIG. 2a;

DETAILED DESCRIPTION

An apparatus comprising two or more parallel carry chain structures, each of the carry chain structures comprising a series of logical structures, where at least one of the logical structures within each of the carry chain structures has an associated input node, output node and carry node. The input node corresponds to a function input term, the output node corresponds to an output term of the function and the carry node corresponds to a carry value to a following logical structure in the series of logical structures.

These and other embodiments of the present invention may be realized in accordance with the following teachings and it should be evident that various modifications and changes may be made in the following teachings without departing from the broader spirit and scope of the invention. The specification and drawings are, accordingly, to be regarded in an illustrative rather than restrictive sense and the invention measured only in terms of the claims.

Figure 2A:
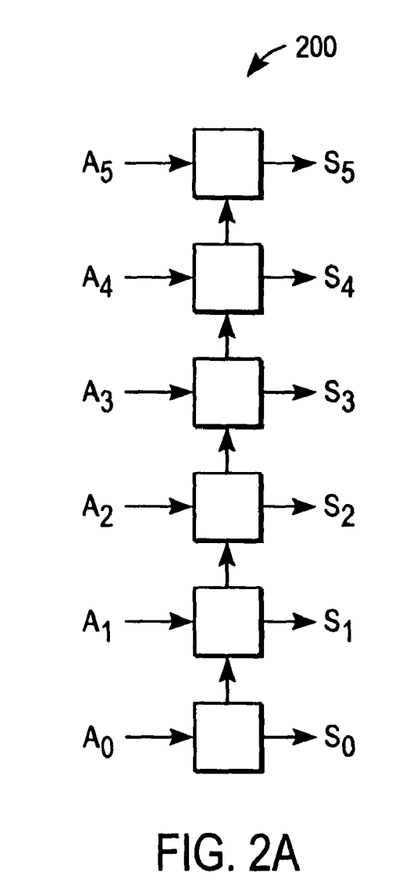
FIG. 2A shows the traditional carry chain implementation of FIG. 1.
Figure 2B:
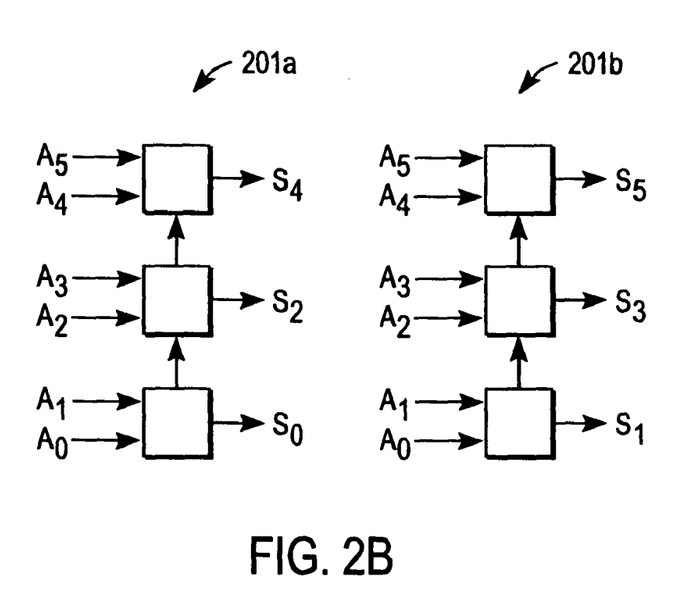

Recall that a problem with traditional carry chain implementations is the propagation delay through the carry chain. For example, referring to FIG. 1, the propagation delay associated with the execution of the function corresponds to the summed propagation delay over all logical structures 101-106. Referring to FIGS. 2a and 2b, FIG. 2a corresponds to a traditional carry chain structure 200 (such as that 100 shown with respect to FIG. 1). FIG. 2b, however, shows a carry chain structure 201a and 210b having less propagation delay than the carry chain structure 200 of FIG. 2a.

Note that that the carry chain structures 201a,b of FIG. 2b is used to implement the same function implemented by the carry chain structure 200 of FIG. 2a. That is, for a given input value across inputs A0 through A5 of FIGS. 2a and 2b, output nodes S0-S5 of FIG. 2b will present the same values as output nodes S0-S5 of FIG. 2a.

However, since the original carry chain 200 of FIG. 2a is effectively split into two parallel carry chains 201a,b (as shown in FIG. 2b), the propagation delay of the implementation of FIG. 2b should have approximately one half the propagation delay of the implementation shown in FIG. 2a. Furthermore, note that the consumed device area remains approximately the same as both implementations (i.e., both implementations consume six logical structures). Many different functions may be implemented with parallel carry chains such as, as just a few examples, an incrementer, a decrementer, an adder, a subtractor, etc.

Figure 2C:
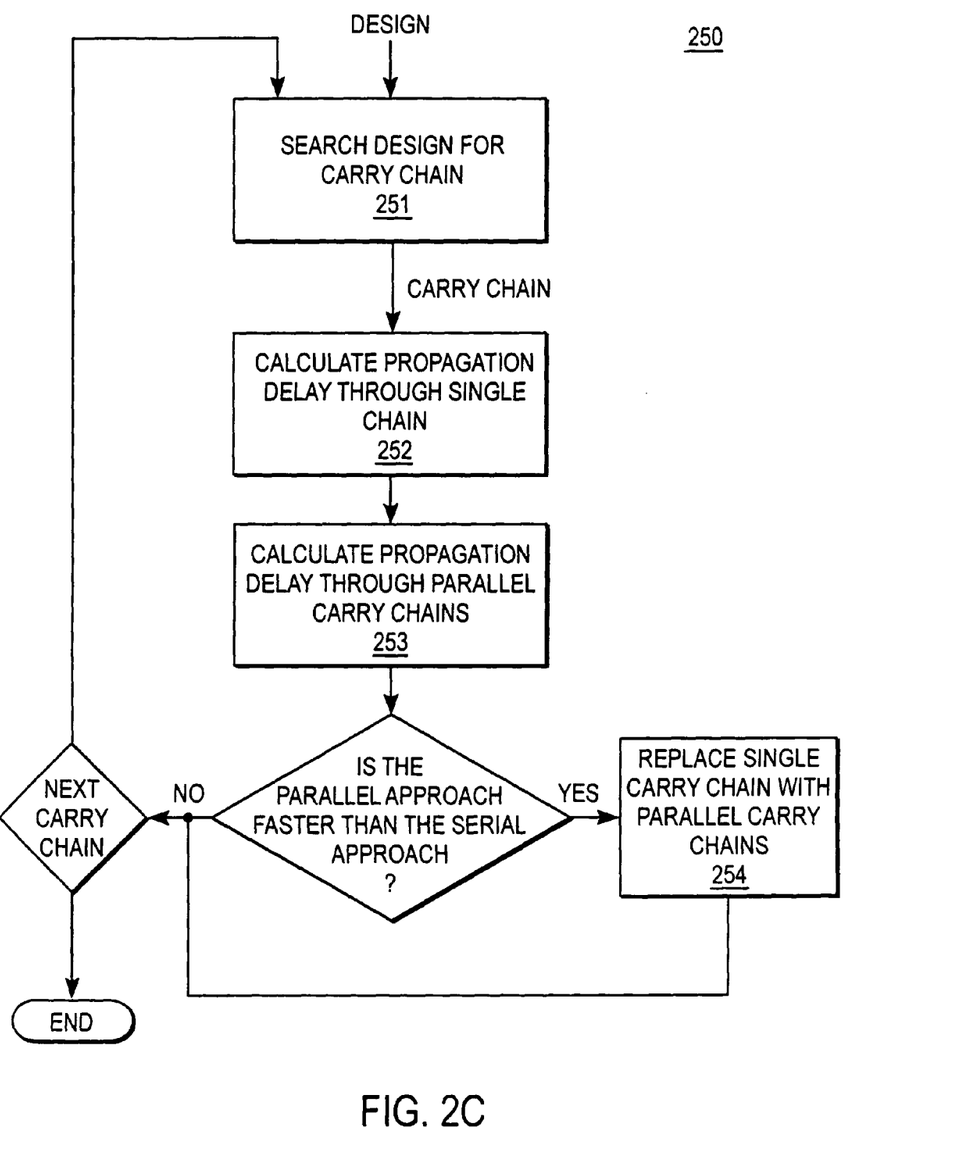
FIG. 2C shows a methodology for implementing parallel carry chains within the design of a semiconductor chip.

FIG. 2c shows an embodiment of a methodology 250 that may be used to generate a parallel carry chain structure. The methodology of FIG. 2c may be utilized by a software program that assists engineers in the design of a semiconductor chip. The method 250 of FIG. 2c searches 251 a designer's design (e.g., as embodied in a register transfer level (RTL) netlist) for a carry chain structure. Note that the designer's design may first be compiled from a first level (e.g., a behavioral level such as the VHSIC high description level (VHDL)) to a second level (e.g., an RTL level) before the design is searched 251.

The search 251 may be performed, for example, by searching for operators (e.g., addition "+", subtraction, multiplication "×") typically implemented with a carry chain. For each carry chain discovered, the propagation delay through the carry chain (which includes any figure of merit representative of the propagation delay through the carry chain) is determined 252.

In an alternate method, rather than searching for a carry chain, the design tool is configured to implement various functions selected by the engineer (or portions of a function) as a parallel carry chain. That is, the design tool is configured to implement a parallel carry chain as a default. An example includes a multiplier. If the engineer chooses to implement a multiplier in his/her design, the design tool automatically employs parallel carry chains in the multiplier.

The reduced propagation delay through the pair of carry chains (which includes any figure of merit representative of the propagation delay through the pair of carry chains) is then determined 253. Parallel carry chains are then implemented 254 in the design (by replacing a single carry chain with parallel carry chains) for those carry chains that would be improved by a pre-determined amount "X" (e.g., a 50% reduction in propagation delay) by splitting the single carry chain into a pair of parallel carry chains. Otherwise, parallel carry chains are not implemented in the design.

Figure 3:
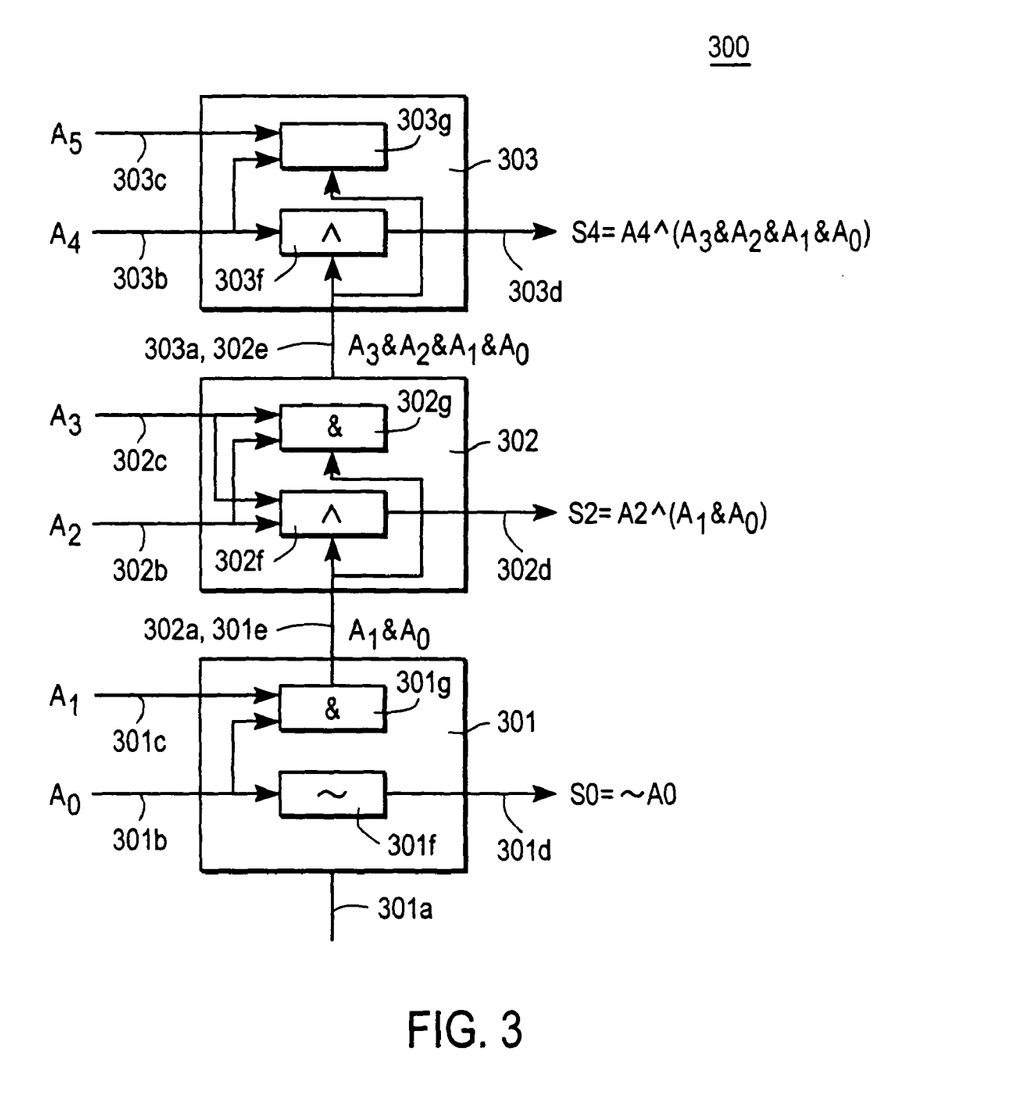
FIG. 3 shows a "three input/two output" carry chain embodiment for an incrementer implemented as two parallel carry chains.
Figure 4:
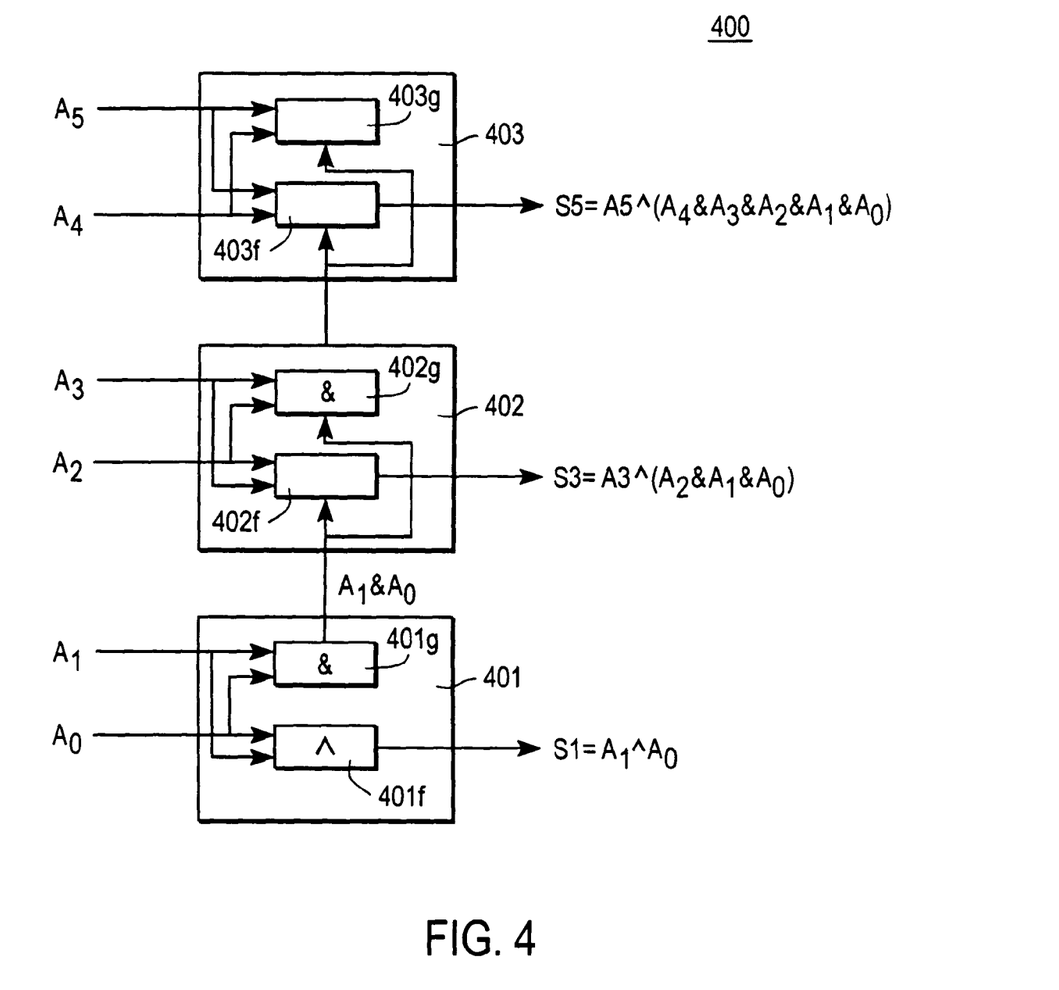
FIG. 4 shows another "three input/two output" carry chain embodiment for the incrementer implemented as two parallel carry chains referred to with respect to FIG. 3.

FIGS. 3 and 4 relate to one embodiment for an incrementer. An incrementer accepts a plurality of input values, treats these input values as representative of a single input value and then presents as an output a series of output values representative of the single input value incremented by a constant (such as "1"). As one example, referring back to FIG. 1, the incrementer 100 can accept a single input value of "011111" across input nodes A5 through A0 respectively and present as an output value "100000" across output nodes S5 through S0, respectively. Thus, take note that in this embodiment, A5 and S5 represent the $2^5$ column in the binary value and A0 and S0 represent the $2^0$ column in the binary value.

For six bit incrementer applications, carry chain structure 300 of FIG. 3 corresponds to one embodiment of the carry chain structure 201a of FIG. 2b. This carry chain structure 300 is used to present even powered terms in the overall output value of the incrementer. Similarly, for six bit incrementer applications, carry chain structure 400 of FIG. 4 corresponds to one embodiment of the carry chain structure 201b of FIG. 2b. This carry chain structure 400 is used to present odd powered terms in the overall output value of the incrementer.

Referring to FIG. 3, note that each logical structure 301, 302, 303 has three respective input nodes 301a,b,c; 302a,b,c; and 303a,b,c. Furthermore each logical structure 301, 302, 303 also has two respective output nodes 301d,e; 302d,e; 303d,e. Logical structures 301, 302, 303 can be referred to as "three input/two output" logical structures and may be found in programmable logic environments as well as in standard cell/custom logic applications.

A logical structure is logic or a combination of logic that performs a logical function. A logical structure may be partitioned into a plurality of functional units that have access to the same input values. Typically, a first functional unit is used to generate an output term of the carry chain while a second functional unit is used to generate a carry output term that is used as an input to the next logical structure in the carry chain.

Within programmable environments, for example, the functional units 301f,g; 302f,g; and 303f,g within each logical structure 301, 302, 303 can be implemented as look up tables that hold the proper output term for each combination of input terms applied to the functional unit. As discussed in more detail ahead, other logical structure architectures may be used as well such as "four input/three output" among others not mentioned herein.

Each input node for a particular logical structure may be coupled to each functional unit within the logical structure. However, depending upon the proper function for a particular carry chain, not every input term that appears at an input node is necessarily used by a functional unit. For example, referring to FIG. 3, the S0 output term only makes use of the A0 input term. As such, functional unit 301f does not effectively use input terms appearing on input nodes 301a or 301c. However, functional unit 302g associated with logical structure 302 uses all three inputs 302a,b,c for its particular function.

Configuring the proper coupling between an input node and a functional within a logical structure is readily achievable by those of ordinary skill for either programmable or hardwired applications. For example, for an input term that is not used, the function executed by the functional may be designed to ignore the unused input term or the coupling between the functional unit and an unused input node may be effectively severed.

In the embodiment of FIG. 3, functional units 301g, 302g are used to produce the proper carry value for the carry chain while functional units 301f, 302f and 303f are used to produce the proper output terms S0, S2, S4 for their respective logical structures 301, 302, 303. In the embodiment of FIG. 4, functional units 401g, 402g are used to produce the proper carry value for the carry chain while functional units 401f, 402f and 403f are used to produce the proper output terms S1, S3, S5 for their respective logical structures 401, 402, 403.

In the depiction of FIGS. 3 and 4: "~" corresponds to a logical NOT function; "^" corresponds to a logical XOR function and "&" corresponds to a logical AND function. Take note, however, that functional units may employ more than one logical function. For example, functional units 402f, 403f of FIG. 4 perform both logical AND and logical XOR functions.

Also note that in the particular examples of FIGS. 2, 3 and 4, one parallel carry chain (e.g., carry chains 201a and 300) is designed to produce "even powered" output terms S0, S2, S4 while another carry chain (e.g., carry chains 201b and 400) are designed to produce "odd powered" output terms S1, S3, S5. Other embodiments, however, need not restrict their carry chains to "even" or "odd" powered output terms. As just one example, the S3 output term of FIG. 4 could be "swapped" with the S2 output term of FIG. 3 by swapping the design of logical structure 302 with the design of logical structure 402 as between the two carry chains 300, 400.

Figure 5:
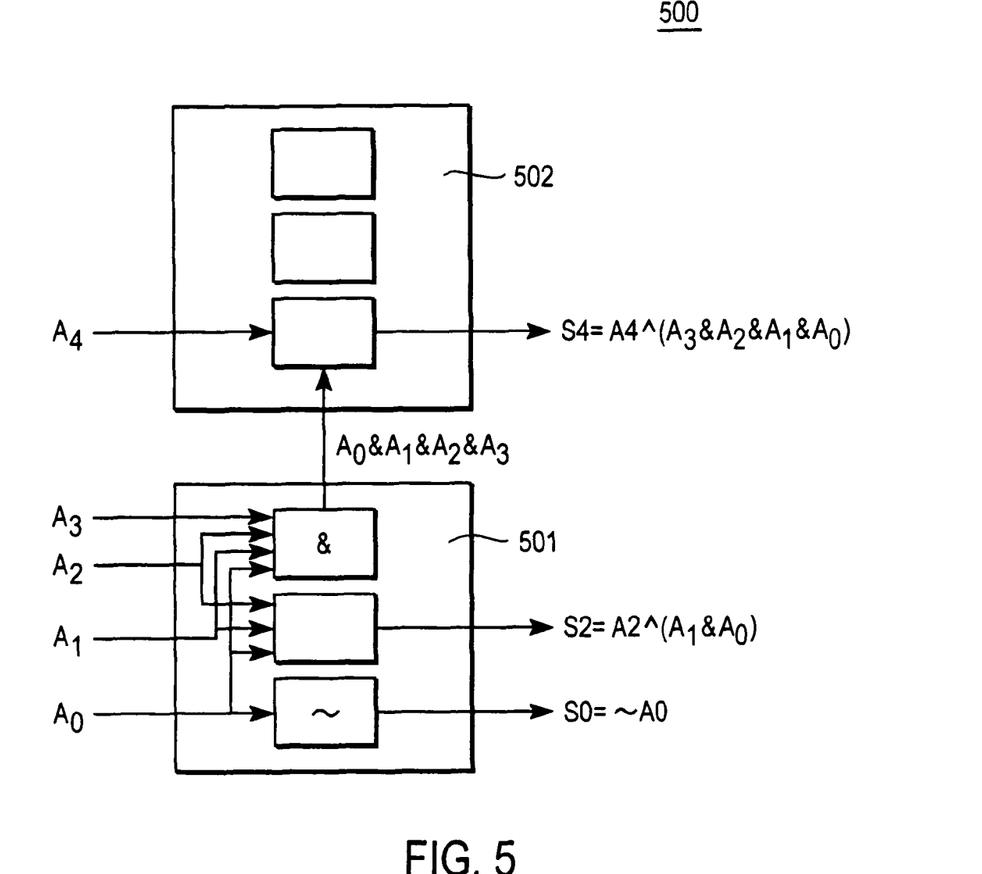
FIG. 5 shows a "four input/three output" carry chain embodiment for an incrementer implemented as two parallel carry chains.
Figure 6:
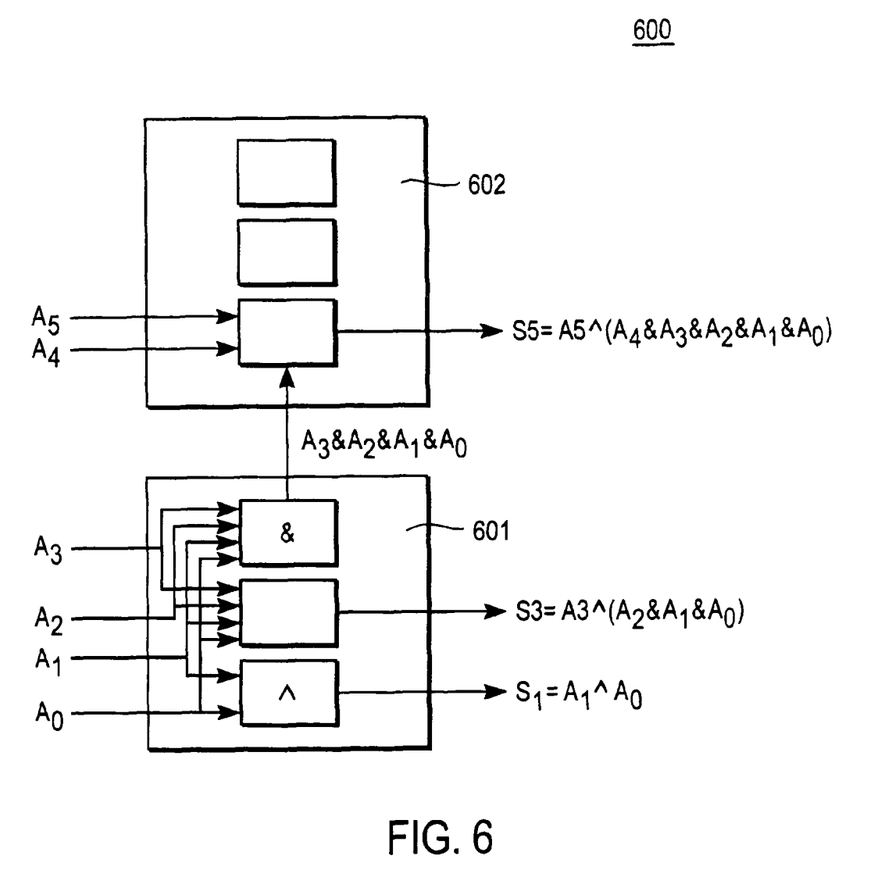
FIG. 6 shows another "four input/three output" carry chain embodiment for the incrementer implemented as two parallel carry chains referred to with respect to FIG. 5.

As mentioned previously, the approach of splitting a function into more than one parallel carry chains may be performed within a number of different logical structure architectures. FIGS. 3 and 4 relate to a "three input/two output" architecture. FIGS. 5 and 6 relate to another incrementer embodiment configured within a "four input/three output" architecture. The carry chain 500 of FIG. 5 generates even powered output terms while the carry chain 600 of FIG. 6 generates odd powered output terms.

Embodiments within other logical structure architectures may be readily determined by those of ordinary skill. Furthermore, if a design environment is supportive of such an approach, various parallel carry chain embodiments may be implemented with one or more carry chains having a mixture of different logical structure architectures. For example, logical structures 502, 602 of FIG. 6 could be implemented with the "three input/two output" architecture shown with respect to FIGS. 3 and 4.

Also, even though the embodiments discussed so far have been limited to only two parallel carry chains, it is possible that other embodiments may be implemented with more than two parallel carry chains. For example, if the incrementer function where to be extended from a six bit incrementer to a twelve bit incrementer, three or more parallel carry chains may be designed to implement the incrementer. Thus the discussion herein generally applies to approaches having two or more parallel carry chains in order to execute a particular function.

Also, other embodiments may extend the parallel carry chain approach to other functions besides an incrementer. Some possible examples include: adders, subtractors, decrementers and multipliers that employ Booth recoding (or a technique similar to Booth recoding). Booth recoders are used to reduce the number of partial products employed in an expression representative of multiplication (as compared to an expression that does not employ Booth recoding). As is known in the art, carry chains may be used with most any large width function (i.e., any function having output terms, such as S5, that depend on more than a few input terms; as well as output terms, such as S0, that depend on relatively few input terms). Thus the present invention may be applied to any function that can have portions of its output terms determined by two or more parallel carry chains.

Figure 7:
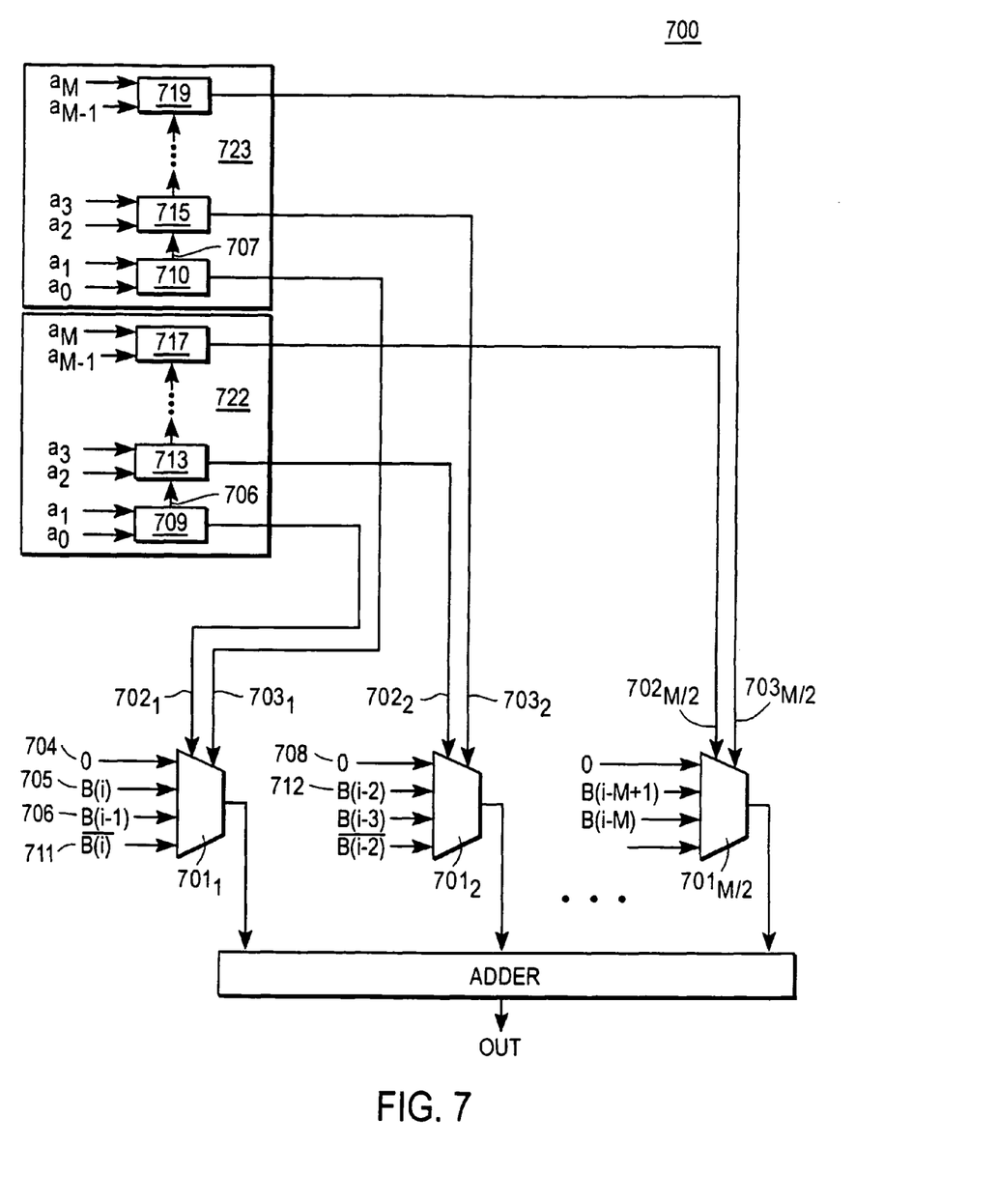
FIG. 7 shows a first embodiment of a multiplier that employs parallel carry chains.

FIG. 7 relates to another approach that multiplies a pair of words. The first digital word A may be expressed as a first vector (a5,a4,a3,a2,a1,a0) and the second digital word B may be expressed as a second vector (b5,b4,b3,b2,b1,b0). Each vector coefficient represents a different power of 2. That is, a5 represents the coefficient for the $2^5$ term of the first digital word A, b5 represents the coefficient for the $2^5$ term of the second digital word B, a4 represents the coefficient for the $2^4$ term of the first digital word A, b4 represents the coefficient for the $2^4$ term of the second digital word B, etc.

The multiplication of a pair of words may be expressed as the addition of a plurality of partial products. For example, the multiplication of the first and second words A, B may be expressed as the addition of each coefficient (and its corresponding power of 2) of the first word A multiplied by the entirety of the second word B. That is, referring to equation 1 below:

$$AB=((a5\times2^5)B)+((a4\times2^4)B)+((a3\times2^3)B)+((a2\times2^2)B)+ \\ ((a1\times2^1)B)+((a0\times2^0)B) \quad \text{Eqn. 1.}$$

Neighboring terms may be grouped so that a two bit recoding scheme is represented. That is, referring to equation 2 below:

$$AB=((((a5\times2^1)+(a4\times2^0))\times2^4)B)+((((a3\times2^1)+(a2\times2^0))\times \\ 2^2)B)+((((a1\times2^1)+(a0\times2^0))\times2^0)B) \quad \text{Eqn 2.}$$

Note that neighboring coefficients are grouped to form a two bit word. That is, a5 and a4 form a two bit word, a3 and a2 form a two bit word, and a1 and a0 form a two bit word. The two bit word formed by the pair of coefficients has four possible states. For example, the combination of (a5,a4) has four possible combinations: 00, 01, 10 and 11.

The four possible combinations involve varying degrees of design complexity for a digital circuit designed to implement the multiplication of the two vectors by decoding each partial product from the state of the coefficient pairs. State 00 is straightforward to implement for the (a5,a4) coefficient pair because the corresponding partial product (((($(a5\times2^1)+$))($a4\times2^0$))$\times2^4$)B) is non existent. That is, if the state of the two bit coefficient pair (a5,a4) is 00, the value of the corresponding partial product may be decoded as 0.

States 01 and 10 are straightforward to implement because they represent multiplication by a single power of 2 term. That is, if the state of (a5,a4) is 01 the vector B is multiplied by $2^4$ while if the state of (a5,a4) is 10 the vector B is multiplied by $2^5$. Multiplication of a vector B by a single power of 2 (e.g., $2^4$ or $2^5$) is straightforward because the vector B may be simply "shifted left" by the applicable power in order to implement the multiplication.

For example, multiplication of a vector B by a power of $2^4$ may be implemented by "shifting" the vector B four spaces to the left (i.e., if vector B is 001000 its multiplication by $2^4$ may be expressed as 0010000000). Thus, the partial product may be decoded from the coefficient pair states of 01 and 10 by a "shift left" of the vector B by the applicable power of 2.

A coefficient pair state of 11, however, involves a higher degree of decoding complexity because two power of two terms are involved. For example, continuing with the (a5,a4) partial product term example, an (a5,a4) coefficient pair state of 11 corresponds to a partial product term of $(2^5+2^4)$B. This may be decoded as the summation of a pair of "shift left" (i.e., a shift left of 5 and a shift left of 4). The summation and extra shift left correspond to more complexity in the decoding process. Typically, the additional complexity results in longer delay in achieving the multiplication and/or inefficient consumption of semiconductor chip surface area.

In the approach of FIG. 7, the impact of the additional complexity on the speed and surface area consumption is reduced by a parallel carry chain circuit arrangement. In the multiplier 700 of FIG. 7, the multiplier produces a plurality of partial products. A partial product appears on the output of each multiplexer $701_1$, $701_2$, ... $701_{M/2}$. Each multiplexer $701_1$, $701_2$, ... $701_{M/2}$ represents a decoded operation.

The coefficients a0, a1, a2, ... $a_M$ of a first digital word A (which may also be referred to as first vector A) are decoded by a pair of parallel carry chains 722, 723. The outputs $702_1$ through $702_{M/2}$ and $703_1$ though $703_{M/2}$ of the parallel carry chains 722, 723 are representative of particular operations that should be performed upon a second digital word B in order to properly multiply the first and second words A, B.

Carry chain output pair $702_1$, $703_1$ is used to produce a first partial product (from mutliplexer $701_1$) having a0 and a1 coefficient terms, carry chain output pair $702_2$, $703_2$ is used to produce a second partial product (from mutliplexer $701_2$) having a2 and a3 coefficient terms, etc., and carry chain output pair $702_1$, $703_1$ is used to produce an M/2th partial product (from mutliplexer $701_{M/2}$) having $a_{M-1}$ and $a_M$ terms.

The possible partial products are provided as inputs to each multiplexer $701_1$, $701_2$, ... $701_{M/2}$. The proper partial product is selected according to the decoding performed by the parallel carry chains 722, 723. For example, note that each mutliplexer $701_1$, $701_2$, ... $701_{M/2}$ can produce a partial product of 0. Each parallel carry chain output pair will effectively select a 0 partial product if the corresponding coefficient pair state is 00.

For example, noting that a decoding of coefficient pair a1/a0 is embodied in parallel carry chain output pair $702_1$, $703_1$, a coefficient pair (a1,a0) of state 00 will produce a carry chain output pair $702_1$, $703_1$ that selects the multiplexer $701_1$ input 704 that provides a 0 partial product. Similarly, each carry chain circuit output pair will effectively select a properly shifted B vector if the corresponding coefficient pair state is 01 or 10.

For example, a coefficient pair (a1,a0) of state 01 will produce a carry chain output pair $702_1$, $703_1$ that selects the multiplexer $701_1$ input 705 that provides a partial product corresponding to a non-shifted B vector (represented as B(i)) because multiplication by $2^0$ (which corresponds to multiplication by 1) has no associated shift. As another example, a coefficient pair (a1,a0) of state 10 will produce a carry chain output pair $702_1$, $703_1$ that selects the multiplexer $701_1$ input 706 that provides a partial product corresponding to a B vector shifted left one space (represented as B(i-1)) because multiplication by $2^1$ corresponds to a shift left of one space.

The decoding for higher order coefficients operates in a similar manner. That is, multiplication by higher powers of two are reflected by larger shifts to the left. For example, note that multiplexer $701_2$ provides for a partial product having a multiplication by $2^2$ term (via a shift left of two spaces represented by B(i-2)) and a partial product having a multiplication by $2^3$ term (via a shift left of three spaces represented by B(i-3)). Also, a 0 partial product is provided if particular higher order multiplication terms do not exist. For example, if no partial products exist having a $2^2$ or $2^3$ term, carry chain output pairs $702_2$, $703_2$ will select multiplexer $701_2$ input 708.

The decoding of a coefficient pair state of 11 is efficiently provided (with respect to both time consumption and silicon chip surface area consumption) with the help of the parallel carry chains 722, 723.

Note that, for a coefficient pair state of 11, any partial product expression of Eqn 2 may be expressed as:

$$((((1\times2^1)+(1\times2^0))\times2^n)B)$$ Eqn. 3.

Noting that $1\times2^1=((1\times2^2)-(2\times2^0))$, Equation 3 may be rewritten as:

$$((((1\times2^2)-(1\times2^0))\times2^n)B)$$ Eqn. 4.

Equation 4 may be viewed as a higher order term $(1\times2^2)2^nB$ and a negative lower order term $-(1\times2^0)2^nB$. Note that $(1\times2^2)$ corresponds to multiplication by 4 and $-(1\times2^0)$ corresponds to multiplication by $-1$.

The carry output of a carry chain logical structure (e.g., carry outputs 706 and 707 of logical structures 709, 710, respectively) may be used to trigger a partial product component having the higher order ($\times4$) term while a carry chain output (e.g., carry chain output pairs $702_1$, $703_1$) may be used to trigger a partial product component having the lower order ($-\times1$) term.

For example, in the approach of FIG. 7, if coefficients a1,a0 have a state of 11, the carry chain output pairs $702_1$, $703_1$ select multiplexer $701_1$ input 711 which corresponds to the inverse of the B vector. The inverse of the B vector corresponds to multiplication by $-1$ which is equal to the lower order term in Equation 4 for n=0.

Furthermore, carry outputs 706 and 707 trigger carry chain output pairs $702_2$, $703_2$ to produce the higher order ($\times4$) output term from multiplexer $701_2$. For example, a higher order term of $2^2B$ (which is equal to $(1\times2^2)2^nB$ for n=0) may be formed by selecting multiplexer $701_2$ input 712 (again, recall that multiplication by $2^2$ may be accomplished by shifting the B vector to the left two spaces as represented by B(i-2)).

The splitting of a 11 coefficient state pair into a higher order ($\times4$) term and a lower order ($-\times1$) term allows each multiplexer $701_1$ through $701_{M/2}$ to be implemented with four selectable channels (e.g., 0, B(i), B(i-1), and ~B(i)). With present technology offerings, a multiplexer having the four selectable channels shown in FIG. 7 can be implemented with a single "4 input" look up table (LUT) within a programmable device (e.g., a field programmable gate array (FPGA)). This conserves space and delay as compared to other solutions that may require more than four selectable LUT inputs.

Figure 8:
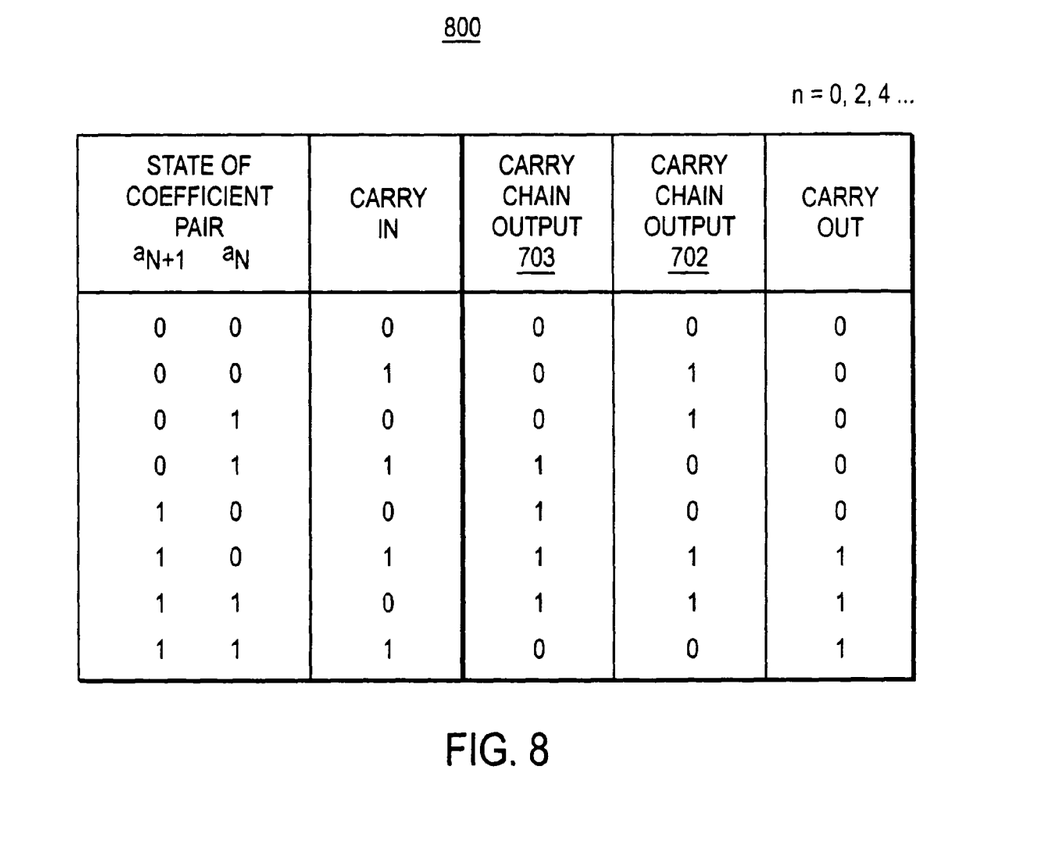
FIG. 8 shows a functional table executed by the parallel carry chains of FIG. 7.

FIG. 8 shows the corresponding function table 800 that is implemented by each logical structure within the carry chains 722, 723 of FIG. 7 (e.g., the function performed by logical structures 709 and 710 in producing carry chain output pairs $702_1$, $703_1$; the function performed by logical structures 713 and 715 in producing carry chain output pairs $702_2$, $703_2$, etc.; and the function performed by logical structures 717 and 719 in producing carry chain output pairs $702_{M/2}$, $703_{M/2}$).

Figure 9:
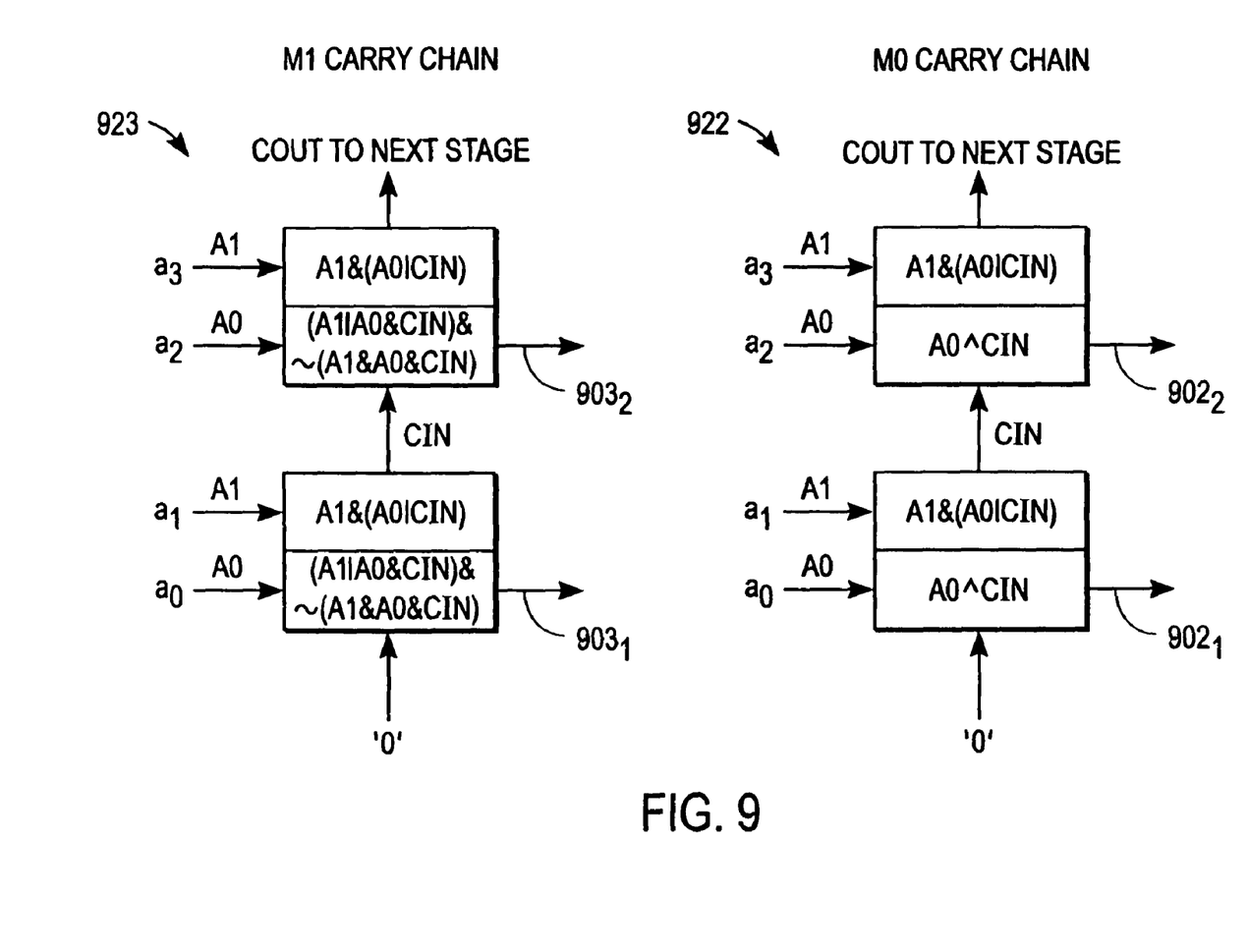
FIG. 9 shows an embodiment of the parallel carry chains of FIG. 7.

FIG. 9, shows a simplified depiction of an embodiment for the corresponding logic that may be employed to form the carry chains according to the functional table 800 of FIG. 8. Note that carry chain 922 corresponds to carry chain 722 of FIG. 7 and carry chain 923 corresponds to carry chain 723 of FIG. 7. In the embodiment of FIG. 9, an "&" corresponds to a logical AND, a "~" corresponds to a logical NOT, a "^" corresponds to a logical/XOR, and a "|" corresponds to a logical OR. Note that functional units 950a and 950b perform the same operation. A frequent characteristic of a parallel carry approach is redundancy as between the logical operations performed by parallel carry chains.

Figure 10:
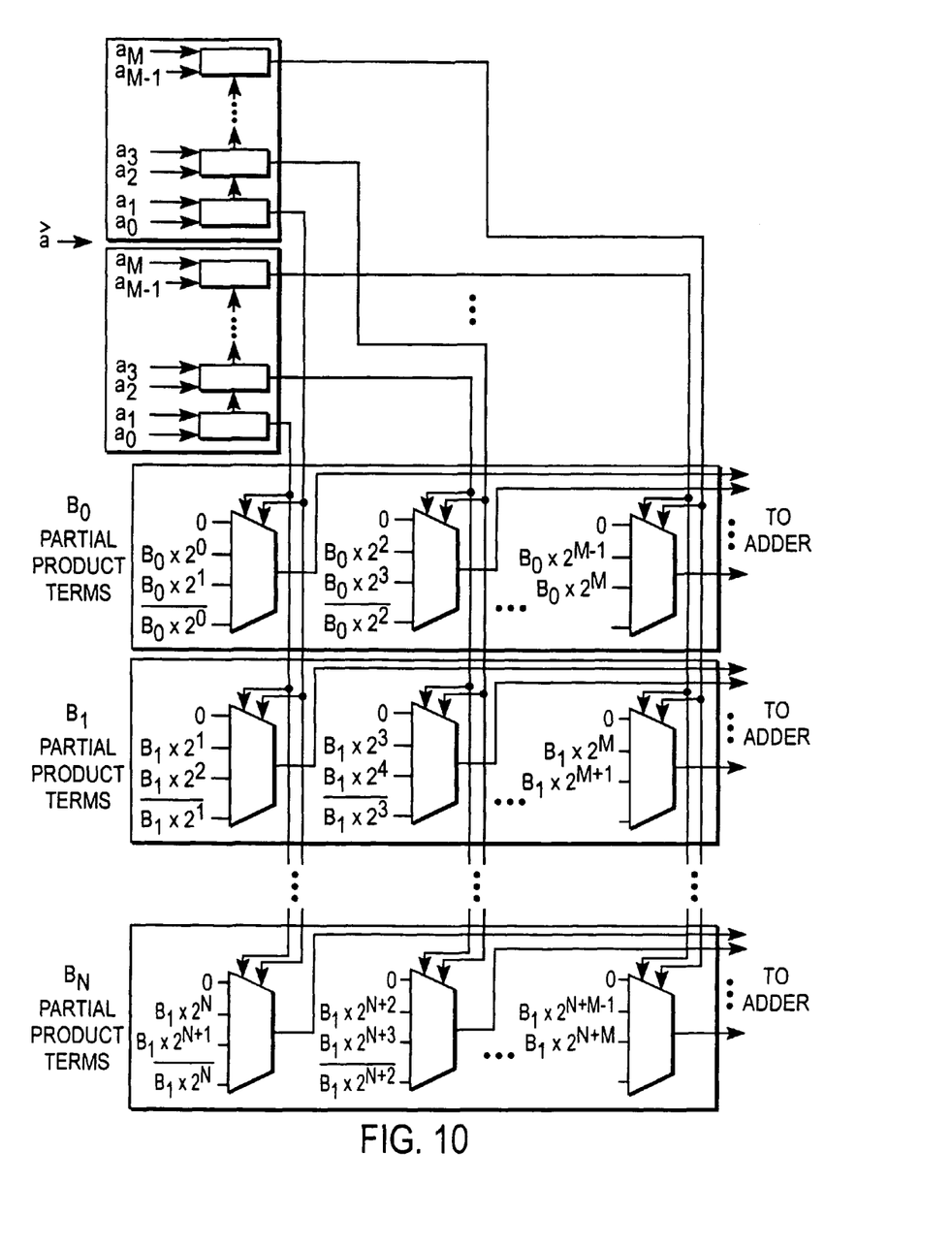
FIG. 10 show a second embodiment of a multiplier that employs parallel carry chains.

FIG. 10 shows an alternate multiplier embodiment that operates according to the same principles described above except that partial product terms are crafted for each vector B coefficient rather than the entire vector B itself. That is, for example, the vector B may be represented by coefficients $b_N$, $B_{N-1}, \ldots, b3, b2, b1, b0$. A corresponding multiplexer generates a partial product term for each vector B coefficient in accordance with the multiplexer control inputs provided by a pair of carry chains that operate according to the table 800 of FIG. 8.

Note also that embodiments of the present description may be implemented not only within a semiconductor chip but also within machine readable media. For example, the designs discussed above may be stored upon and/or embedded within machine readable media associated with a design tool used for designing semiconductor devices. Examples include a netlist formatted in the VHSIC Hardware Description Language (VHDL) language, Verilog language or SPICE language. Some netlist examples include: a behavioral level netlist, a register transfer level (RTL) netlist, a gate level netlist and a transistor level netlist. Machine readable media also include media having layout information such as a GDS-II file. Furthermore, netlist files or other machine readable media for semiconductor chip design may be used in a simulation environment to perform the methods of the teachings described above.

Thus, it is also to be understood that embodiments of this invention may be used as or to support a software program executed upon some form of processing core (such as the CPU of a computer) or otherwise implemented or realized upon or within a machine readable medium. A machine readable medium includes any mechanism for storing or transmitting information in a form readable by a machine (e.g., a computer). For example, a machine readable medium includes read only memory (ROM); random access memory (RAM); magnetic disk storage media; optical storage media; flash memory devices; electrical, optical, acoustical or other form of propagated signals (e.g., carrier waves, infrared signals, digital signals, etc.); etc.

What is claimed is:

1. An apparatus, comprising:
    two or more parallel carry chain structures within an integrated circuit, each of said carry chain structures comprising a series of logical structures, at least one of said logical structures within each of said carry chain structures having an associated input node, output node and carry node, said input node corresponding to a common input term of a first function and a second function separate from the first function, said output node corresponding to an output term of said first function; said carry node corresponding to a carry term, as an output term of said second function, to a following logical structure in said series of logical structures.

2. The apparatus of claim 1 wherein said first function comprises an XOR function to provide said output term.

3. The apparatus of claim 1 wherein said second function of one of said logical structures comprises an AND function to provide said carry term, wherein the inputs of the AND function comprise said input term of the one of said logical structures and a carry term produced by another of said logical structures.

4. The apparatus of claim 1 wherein said first and second functions comprise a look up table to receive said input term.

5. The apparatus of claim 1 wherein an associated input node for one of said two or more parallel carry chain structures is connected to an associated input node for another of said two or more parallel carry chain structure.

6. The apparatus of claim 1 wherein said logical structure comprises two look up tables, and wherein said carry node is coupled to one of said look up tables and said output node is coupled to the other of said look up tables.

7. The apparatus of claim 1 wherein said two or more parallel carry chain structures perform a function of one of an incrementer, a decrementer, an adder, a subtractor, and a multiplier that employs Booth recoder.

8. A method comprising:
    within a semiconductor device design environment for designing an electrical circuit, responding to a selection of a function by implementing at least a portion of said function as two or more parallel carry chains,
    wherein the designing is performed on a representation of the electrical circuit, the representation being stored in a memory of a data processing system which includes a processor which performs the designing, and
    wherein, each of said carry chain structures comprises a series of logical structures, at least one of said logical structures within each of said carry chain structures has an associated input node, output node and carry node, said input node corresponds to a common input term of a first function and a second function separated from the first function, said output node corresponds to an output term of said first function, and said carry node corresponds to a carry term, as an output term of said second function, to a following logical structure in said series of logical structures.

9. The method of claim 8 wherein said at least a portion of said function determines channel select values for a multiplexer within a multiplier.

10. The method of claim 8 wherein said semiconductor device design is an RTL netlist.

11. The method of claim 8 wherein said first function comprises an XOR function to provide said output term.

12. The method of claim 8 wherein said second function of one of said logical structures comprises an AND function to provide said carry term, wherein the inputs of the AND function comprise said input term of the one of said logical structures and a carry term produced by another of said logical structures.

13. The method of claim 8 wherein said first and second functions comprise a look up table to receive said input term.

14. The method of claim 8 wherein an associated input node for one of said two or more parallel carry chain structures is connected to an associated input node for another of said two or more parallel carry chain structure.

15. The method of claim 8 wherein said logical structure comprises two look up tables, and wherein said carry node is coupled to one of said look up tables and said output node is coupled to the other of said look up tables.

16. The method of claim 8 wherein said two or more parallel carry chain structures perform a function of one of an incrementer, a decrementer, an adder, a subtractor, and a multiplier that employs Booth recoder.

17. A machine readable medium having stored thereon sequences of instructions which are executable by a digital processing system, and which, when executed by said digital processing system, cause said system to perform a method for designing an electrical circuit, comprising:
    within a semiconductor device design environment for the electrical circuit, responding to a selection of a function by implementing at least a portion of said function as one or more parallel carry chains, wherein each of said carry chain structures comprises a series of logical structures, at least one of said logical structures within each of said carry chain structures has an associated input node, output node and carry node, said input node corresponds to a common input term of a first function and a second function separate from the first function, said output node corresponds to an output term of said first function, and said carry node corresponds to a carry term, as an output term of said second function, to a following logical structure in said series of logical structures.

18. The machine readable medium of claim 17 wherein said at least a portion of said function determines channel select values for a multiplexer within a multiplier.

19. The machine readable medium of claim 17 wherein said first function comprises an XOR function to provide said output term.

20. The machine readable medium of claim 17 wherein said second function of one of said logical structures comprises an AND function to provide said carry term, wherein the inputs of the AND function comprise said input term of the one of said logical structures and a carry term produced by another of said logical structures.

21. The machine readable medium of claim 17 wherein said first and second functions comprise a look up table to receive said input term.

22. The machine readable medium of claim 17 wherein an associated input node for one of said two or more parallel carry chain structures is connected to an associated input node for another of said two or more parallel carry chain structure.

23. The machine readable medium of claim 17 wherein said logical structure comprises two look up tables, and wherein said carry node is coupled to one of said look up tables and said output node is coupled to the other of said look up tables.

24. The machine readable medium of claim 17 wherein said two or more parallel carry chain structures perform a function of one of an incrementer, a decrementer, an adder, a subtractor, and a multiplier that employs Booth recoder.

* * * * *